(12) United States Patent  
Ai et al.

(10) Patent No.: US 12,125,173 B2  
(45) Date of Patent: Oct. 22, 2024

(54) VIDEO DENOISING METHOD AND DEVICE, AND COMPUTER READABLE STORAGE MEDIUM

(71) Applicant: ZTE CORPORATION, Guangdong (CN)

(72) Inventors: Jisong Ai, Guangdong (CN); Ke Xu, Guangdong (CN); Dehui Kong, Guangdong (CN); Ning Wang, Guangdong (CN); Xin Liu, Guangdong (CN); Jing You, Guangdong (CN); Fang Zhu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 357 days.

(21) Appl. No.: 17/624,237

(22) PCT Filed: Jul. 14, 2020

(86) PCT No.: PCT/CN2020/101806  
§ 371 (c)(1),  
(2) Date: Dec. 30, 2021

(87) PCT Pub. No.: WO2021/017809  
PCT Pub. Date: Feb. 4, 2021

(65) Prior Publication Data  
US 2022/0351335 A1 Nov. 3, 2022

(30) Foreign Application Priority Data  
Jul. 29, 2019 (CN) .......................... 201910691413.1

(51) Int. Cl.  
*G06T 5/70* (2024.01)  
*G06T 7/246* (2017.01)

(52) U.S. Cl.  
CPC ................ *G06T 5/70* (2024.01); *G06T 7/248* (2017.01); *G06T 2207/10016* (2013.01); *G06T 2207/20021* (2013.01); *G06T 2207/20076* (2013.01)

(58) Field of Classification Search  
None  
See application file for complete search history.

(56) References Cited

U.S. PATENT DOCUMENTS

| 9,633,416 B1 | 4/2017 | Lee et al. |
| 2005/0094889 A1 | 5/2005 | Lin et al. |

(Continued)

FOREIGN PATENT DOCUMENTS

| CN | 101489034 A | 7/2009 |
| CN | 101448077 B | 6/2010 |

(Continued)

OTHER PUBLICATIONS

The Scientist and Engineer's Guide to Digital Signal Processing, Ch 15, Moving average Filter, Steven W. Smith, Second Edition, California Technical Publishing , 1999 (Year: 1999).*

(Continued)

*Primary Examiner* — Randolph I Chu  
(74) *Attorney, Agent, or Firm* — Li & Cai Intellectual Property (USA) Office (57) ABSTRACT

The present disclosure discloses a video denoising method and device, and a computer-readable storage medium. The video denoising method includes: dividing each video frame in an input video frame sequence into sub-image blocks, and calculating a block variance of each of the sub-image blocks; calculating an average variance of the sub-image blocks in a current video frame according to the calculated block variances, determining a noise level of the current video frame according to the average variance, selecting a (Continued)

denoise strength and a noise characteristic curve that match the noise level; and denoising the current video frame according to the denoise strength and the noise characteristic curve.

17 Claims, 4 Drawing Sheets

(56) References Cited

U.S. PATENT DOCUMENTS

| | | | |
|---|---|---|---|
| 2008/0239153 | A1 | 10/2008 | Chiu |
| 2008/0316364 | A1 | 12/2008 | Au et al. |
| 2009/0278961 | A1 | 11/2009 | Mohanty et al. |
| 2015/0187053 | A1 | 7/2015 | Chen et al. |
| 2017/0178309 | A1* | 6/2017 | Rakhshanfar .......... H04N 17/00 |
| 2018/0025474 | A1 | 1/2018 | Mei et al. |
| 2021/0004938 | A1* | 1/2021 | Tang ...................... G06T 5/70 |
| 2022/0351335 | A1* | 11/2022 | Ai ......................... G06T 5/70 |
| 2023/0351582 | A1* | 11/2023 | Taylor ................... H04N 23/90 |
| 2023/0377104 | A1* | 11/2023 | Steen ...................... G06T 5/20 |

FOREIGN PATENT DOCUMENTS

| | | | |
|---|---|---|---|
| CN | 102118546 | A | 7/2011 |
| CN | 102164278 | A | 8/2011 |
| CN | 102238316 | A | 11/2011 |
| CN | 102436646 | A | 5/2012 |
| CN | 102769722 | A | 11/2012 |
| CN | 103491282 | * | 9/2013 |
| CN | 103414845 | A | 11/2013 |
| CN | 103491282 | A | 1/2014 |
| CN | 104021533 | A | 9/2014 |
| CN | 104134191 | A | 11/2014 |
| CN | 104680483 | A | 6/2015 |
| CN | 105208376 | A | 12/2015 |
| CN | 107610072 | A | 1/2018 |
| CN | 109859126 | A | 6/2019 |
| KR | 20050041886 | A | 5/2005 |
| KR | 20090115234 | A | 11/2009 |
| KR | 20170044028 | A | 4/2017 |
| KR | 20190004256 | A | 1/2019 |
| WO | 2016185708 | A1 | 11/2016 |
| WO | 2018153150 | A1 | 8/2018 |

OTHER PUBLICATIONS

China Patent Office, First Office Action issued Nov. 21, 2022 for application No. CN201910691413.1.
Japan Patent Office, First Office Action issued Nov. 29, 2022 for application No. JP2021-564231.
A. Buades, et al., "Multi image noise estimation and denoising", HAL:hal-00510866, version 1, Aug. 22, 2010, 28pgs.
S. I. Olsrn:"Estimation of noise in images: an evaluation", CVGIP: Graphical Models and Image Processing, Academic Press, vol. 55, No. 4, Jul. 1, 1993, 5pgs.
Kostadin Dabov, et al., "Image Denoising by Sparse 3-D Transform-Domain Collaborative Filter", IEEE Transactions on Image Processing, IEEE, USA, vol. 16, No. 8, Aug. 1, 2007, 16pgs.
ZTE Corporation, Extended European Search Report, EP 20848408.9, May 3, 2022, 77pgs.
Korean Patent Office, First Office Action issued on Jan. 2, 2023 for application No. KR10-2021-7034597.
S. I. Olsen:"Estimation of noise in images: an evaluation", Graphical Models and Image Processing, vol. 55, No. 4, pp. 319-323, Jul. 31, 1993.
Sanechips Technology Co., Ltd., International Search Report, PCT/CN2020/101806, Oct. 21, 2020, 7 pgs.

* cited by examiner

VIDEO DENOISING METHOD AND DEVICE, AND COMPUTER READABLE STORAGE MEDIUM

CROSS REFERENCE TO RELATED APPLICATIONS

The present disclosure is a United States National Stage Application filed under 35 U.S.C. § 371 of PCT Patent Application Serial No. PCT/CN2020/101806, filed on Jul. 14, 2020, which claims priority to Chinese patent application No. 201910691413.1, filed on Jul. 29, 2019, each of which is incorporated by reference herein in its entirety.

TECHNICAL FIELD

The present disclosure relates to the field of video processing technology, for example, to a video denoising method and device, and a computer-readable storage medium.

BACKGROUND

Image denoising is always a very important direction in the field of image processing. With the popularity of mobile phone photography, photography technology has undergone earth-shaking changes, from a professional digital single-lens reflex camera at the beginning to a simpler point-and-shoot camera on a smart phone. Due to a limitation of a size of an aperture and a sensor, the smart phone may generate more noises than the single-lens reflex camera, resulting in a reduced resolution of received image or video compared with an original image or video, which not only affects the visual effect, but also affects an accuracy of an acquisition or recognition operation for the image or video from which a moving target need to be acquired or identified. Therefore, better denoising algorithms are needed to improve the image quality. An adaptive denoising algorithm may dynamically adjust denoising related parameters by estimating a noise level, so as to achieve an effect of retaining image details as much as possible without noise residue. However, the adaptive denoising algorithm has a problem of low accuracy in estimation of the noise level of a current frame image.

Noise estimation algorithms mainly fall into the following two categories.

Category 1: Estimating the Noise Level of the Current Frame Image.

The steps are as follows: 1) dividing an image or a video frame image to be estimated into sub-image blocks with a same size; 2) performing a variance calculation on the obtained sub-image blocks respectively to obtain a variance value of each of the sub-image blocks; 3) according to the variance value of each of the sub-image blocks, selecting a certain proportion of variances which are relatively small to estimate the noise level, so as to obtain the noise level of the current frame image. This algorithm has relatively large errors for images with rich details, and is liable to regard the details as noise.

Category 2: Estimating the Noise Level of the Current Frame Image and a Previous Frame Image.

The steps are as follows: 1) dividing the current frame image and the previous frame image of a video to be estimated into one-to-one corresponding sub-image blocks with the same size; 2) performing a variance calculation on the obtained one-to-one corresponding sub-image blocks respectively to obtain the variance value of each of the sub-image blocks; 3) according to the variance value of each of the sub-image blocks, selecting a certain proportion of variances which are relatively small to estimate the noise level, so as to obtain the noise level of the current frame image. When a brightness of the adjacent frames changes or there is large-scale motion in the adjacent frames, this algorithm is prone to misjudgments.

When there is a deviation in the estimation of the noise level of the image frame, unreasonable denoising parameters may cause a flickering phenomenon of one image frame being clear, but the next image frame being blurred, or one image frame having noise residual, and the next image frame having no noise residual.

The algorithms that take good effects on video denoising, such as a video block-matching and 3D filtering (VBM3D), a video block-matching and 4D filtering (VBM4D), etc., have a relatively high time complexity and a relatively high hardware resource cost. In addition, many denoising algorithms do not consider the impact of brightness on noise, and use a uniform denoising strength for all pixel points in a frame. Such processing does not actually conform to the characteristics of Gaussian noise.

SUMMARY

Embodiments of the present disclosure provide a video denoising method and device, and a computer-readable storage medium, which can improve an accuracy of a noise level estimation.

Some embodiments of the present disclosure provide a video denoising method, including:
dividing each video frame in an input video frame sequence into sub-image blocks, and calculating a block variance of each of the sub-image blocks;
calculating an average variance of sub-image blocks in a current video frame according to the calculated block variances, determining a noise level of the current video frame according to the calculated average variance, and selecting a denoise strength and a noise characteristic curve that match the noise level; and
denoising the current video frame according to the denoise strength and the noise characteristic curve.

Some embodiments of the present disclosure also provide a computer-readable storage medium, configured to store one or more programs, and the one or more programs may be executed by one or more processors to perform the above video denoising method.

Some embodiments of the present disclosure also provide a video denoising device, including a processor and a memory. The processor and the memory are connected to each other by an electrical coupling, and the processor is configured to execute a program stored in the memory to perform the above video denoising method.

Some embodiments of the present disclosure also provide a video denoising device, including a noise statistics module, a noise estimation module, and a video denoising module.

The noise statistics module is configured to divide each video frame in the input video frame sequence into the sub-image blocks, and calculate the block variance of each of the sub-image blocks.

The noise estimation module is configured to calculate the average variance of all the sub-image blocks in the current video frame according to the calculated block variances, determine the noise level of the current video frame according to the calculated average variance, and select the denoise strength and the noise characteristic curve that match the noise level.

The video denoising module is configured to denoise the current video frame according to the denoise strength and the noise characteristic curve.

DETAILED DESCRIPTION

Embodiments of the present disclosure will be described hereafter with reference to the accompanying drawings.

Figure 1:
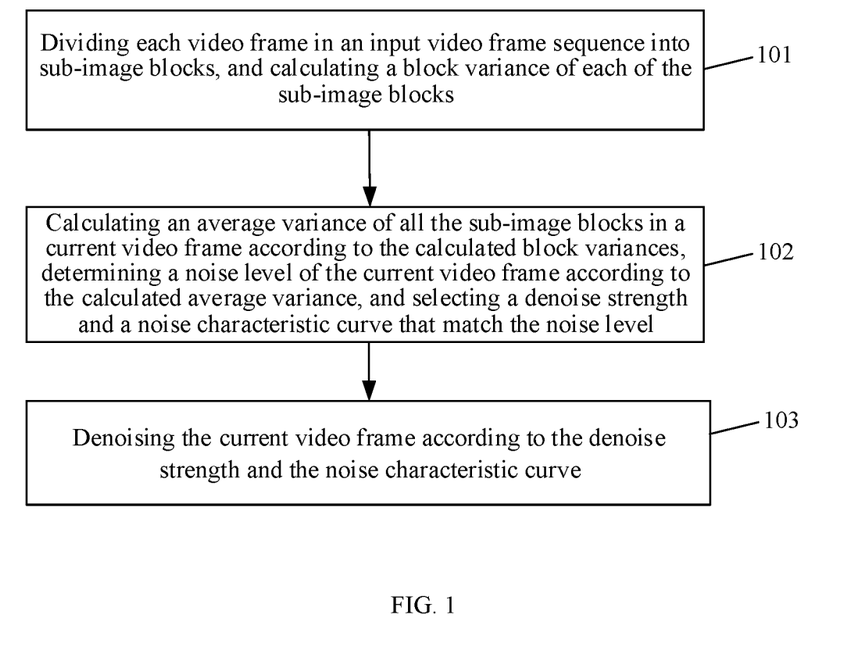
FIG. 1 is an exemplary flowchart of a video denoising method provided in an embodiment of the present disclosure.

The steps shown in the flowcharts of the accompanying drawings may be executed in a computer system such as a set of computer-executable instructions. Also, although a logical sequence is shown in the flowcharts, in some cases, the steps shown or described may be executed in a different order from that described herein. As shown in FIG. 1, some embodiments of the present disclosure provide a video denoising method, which includes the following steps.

In step 101, each video frame in an input video frame sequence is divided into sub-image blocks, and a block variance of each of the sub-image blocks is calculated.

In an exemplary embodiment, calculating the block variance of each of the sub-image blocks includes:

calculating a spatial variance of each of the sub-image blocks, calculating a temporal variance between each of the sub-image block in the current video frame and a sub-image block in a corresponding position in a previous video frame of the current video frame, and selecting a smaller value of the spatial variance and the temporal variance as the block variance of each of the sub-image block.

In this embodiment, a video frame f_in(n) with noise and a previous video frame f_in(n−1) of the video frame f_in(n) are input, and the f_in(n) and the f_in(n−1) are divided into sub-image blocks with a same size according to a first preset value. A spatial variance δs of each of the sub-image blocks in the f_in(n) is calculated. A temporal variance δt of each of the sub-image blocks in the f_in(n) is obtained by subtracting a pixel value of a sub-image block in a corresponding position in the f_in(n−1) from a pixel value of each of the sub-image blocks in the f_in(n). The smaller value of the spatial variance δs and the temporal variance δt of each of the sub-image blocks in the f_in(n) is a final variance of a sub-image block.

In step 102, an average variance of all the sub-image blocks in a current video frame is calculated according to the calculated block variances, a noise level of the current video frame is determined according to the calculated average variance, and a denoise strength and a noise characteristics curve that match the noise level are selected.

In an exemplary embodiment, calculating the average variance of all the sub-image blocks in the current video frame according to the calculated block variances includes:

sorting the block variances of all the sub-image blocks in the current video frame in an ascending order; and accumulating the sorted first n block variances of sub-image blocks, and taking a ratio of an accumulated sum of the block variances to the n as the average variance of all the sub-image blocks in the current video frame, where the n is a natural number greater than 1.

In this embodiment, the first n sub-image blocks may be top N % of all the sub-image blocks in the current video frame. For example, the first n sub-image blocks may be set as top 10% of the sorted sub-image blocks.

In an exemplary embodiment, determining the noise level of the current video frame according to the calculated average variance includes:

recording the noise level of the current video frame as 0 when the calculated average variance is less than a preset variance value; and taking the calculated average variance as the noise level of the current video frame when the calculated average variance is greater than or equal to the preset variance value.

In an exemplary embodiment, before selecting the denoise strength and the noise characteristic curve that match the noise level, the method further includes:

calculating an average value of the noise levels of the current video frame and m video frames prior to the current video frame, where the m is a natural number greater than 1; and taking the calculated average value of the noise levels as a smoothed noise level of the current video frame.

In an exemplary embodiment, the denoise strength includes a spatial denoise strength and a temporal denoise strength.

Figure 2:
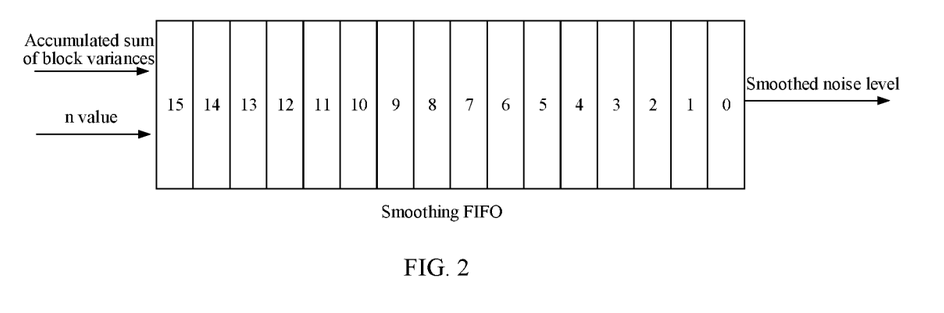
FIG. 2 is a schematic diagram of a smoothing processing of a noise level by a first-in first-out queue provided in an embodiment of the present disclosure.

In this embodiment, after the variance value of each of the sub-image blocks in the f_in(n) being obtained, the multiple sub-image blocks are sorted according to the variance value in an ascending order. The variances of the sub-image blocks with a total number of a second preset value are accumulated, and the average variance of all the sub-image blocks is calculated according to an accumulated sum of the variances and the second preset value. If the average variance of all the sub-image blocks is less than a third preset value, 0 is written into a first input first output (FIFO) queue, otherwise, the average variance of all the sub-image blocks is written into the FIFO queue. As shown in FIG. 2, a depth of the FIFO may be 16, that is, noise level data of latest 16 frames can be stored. The smoothed noise level of the current video frame may be obtained by summing and averaging all the data (Average value) in the FIFO. Then, according to the noise level, the spatial denoise strength, the temporal denoise strength, and corresponding noise characteristic curve that match the noise level are selected.

In step 103, the current video frame is denoised according to the denoise strength and the noise characteristic curve.

In an exemplary embodiment, the step 103 includes:

performing a spatial denoising on the current video frame according to the spatial denoise strength and the noise characteristic curve, estimating a motion strength and a motion vector of each of the sub-image blocks of the current video frame according to the current video frame and a previous video frame of the current video frame, and obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame after the spatial denoising and pixel points in the previous video frame pointed to by the motion vectors corresponding to the pixel points in the current video frame to obtain denoised pixel points.

In an exemplary embodiment, an algorithm of the spatial denoising is a block matching and 3D filtering (BM3D) denoising algorithm, and a proportionally scaling operation is performed on a Wiener coefficient in a Wiener filtering operation of the BM3D denoising algorithm according to a brightness value of the pixel points in the current video frame and the noise characteristic curve.

Figure 3:
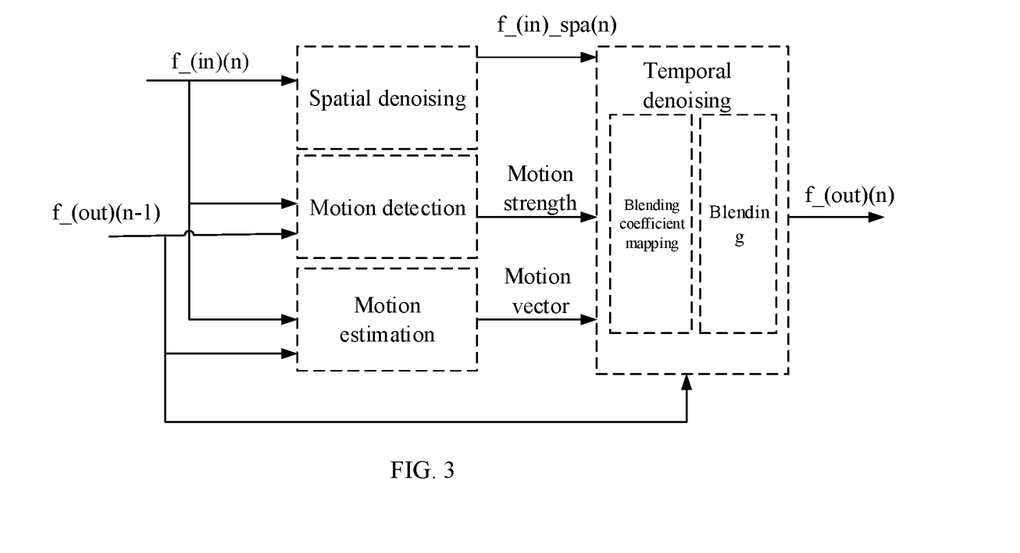
FIG. 3 is an exemplary flowchart of a video denoising process provided in an embodiment of the present disclosure.

In this embodiment, as shown in FIG. 3, the step 103 includes five related operations: spatial denoise, motion estimate, motion detect, blending coefficient mapping (motion2$^\alpha$) and blending, and the input includes the current video frame to be denoised f_in(n), the denoised previous video frame f_out(n−1), and a spatial denoise strength coefficient, a temporal denoise strength coefficient, the noise characteristic curve and the noise level output in the step 102.

Figure 4:
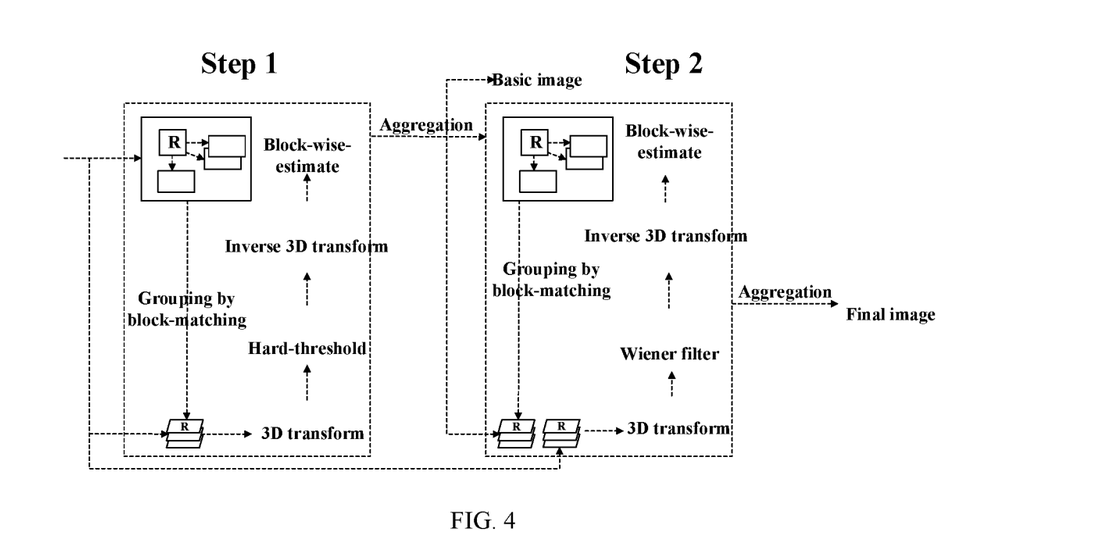
FIG. 4 is an exemplary flowchart of a spatial denoising process provided in an embodiment of the present disclosure.

Operation of spatial denoising: As shown in FIG. 4, the operation of spatial denoising in the present disclosure may use the BM3D denoising algorithm, but present disclosure provides improvement to this algorithm to make the algorithm more adaptable to characteristics of the noise introduced by a video capture device. During the Wiener filter, the present disclosure performs a scaling operation in a certain proportion on the Wiener coefficient according to the brightness value of the pixel points and the noise characteristic curve. The operation of spatial denoising in the present disclosure does not necessarily apply the BM3D algorithm, other filtering algorithms such as a guided filtering, a bilateral filtering and the like may also be used, but a processing effect is slightly worse than that of the BM3D algorithm.

Figure 5:
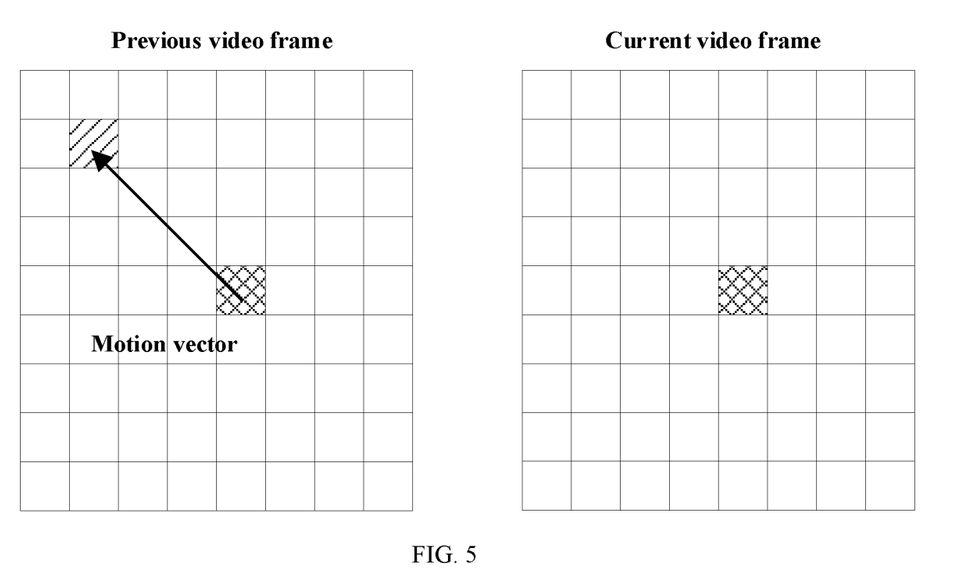
FIG. 5 is a schematic diagram of a calculation of a motion vector based on motion compensation provided in an embodiment of the present disclosure.

Operation of motion estimation: The current video frame to be denoised f_in(n) is divided according to a preset value, and an image of the current video frame is divided into the sub-image blocks. The sub-image blocks may be overlapped, and then for each of the sub-image blocks, a calculation operation of a minimum squared error (MSE) is performed on all the sub-image blocks within a certain search range centered on a corresponding position in the denoised previous video frame f_out(n−1). As shown in FIG. 5, the sub-image block corresponding to the calculated smallest MSE value is set as a best matching block corresponding to the current sub-image block in the current video frame, and the motion vector is obtained by subtracting a coordinate value of the current sub-image block from a coordinate value of the best matching block in the previous frame of image.

Operation of motion detection: According to the aforementioned operation of motion estimation, each sub-image block in the current video frame to be denoised corresponds to one best matching block in the previous video frame, and a calculation operation of sum of absolute difference (SAD) is performed on each of the sub-image blocks and the corresponding best matching block.

$$SAD = \sum_{i=0}^{i=M} \sum_{j=0}^{j=N} |p_t(i,j) - p_{t-1}(i,j)|,$$

where the SAD value of each of the sub-image blocks is regarded as a motion strength value of each of the sub-image blocks, where (i, j) is a two-dimensional coordinate of a pixel point to be denoised, and 0≤i≤M, 0≤j≤N.

Figure 6:
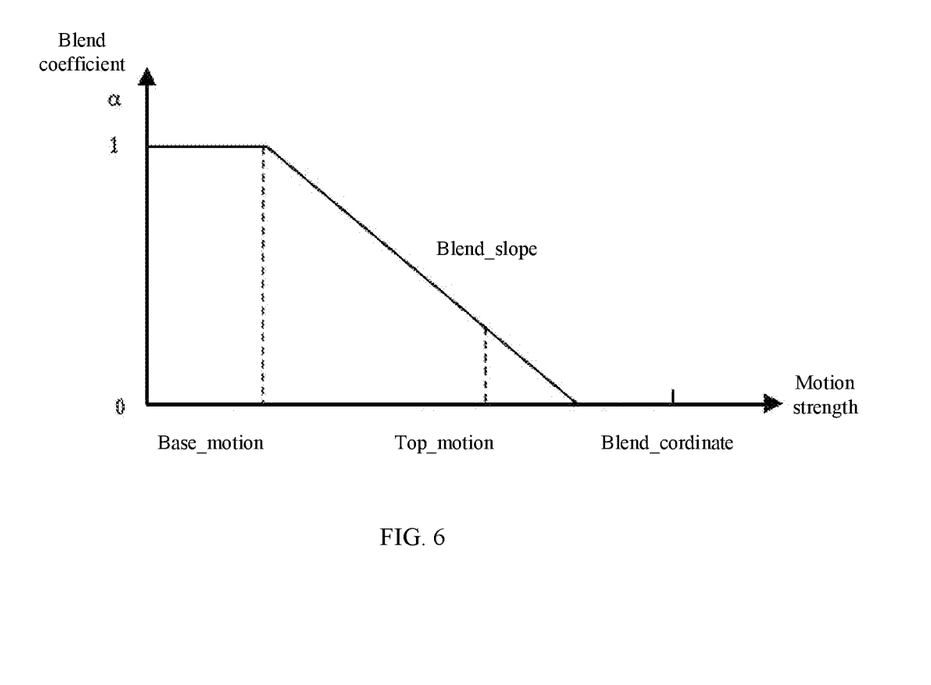
FIG. 6 is a schematic diagram of a mapping relationship between a motion strength and a blending coefficient provided in an embodiment of the present disclosure.

Operation of blending coefficient mapping: According to the motion strength value obtained by the above-mentioned operation of motion detection, a blending coefficient α may be obtained by mapping as shown in FIG. 6. In FIG. 6, an abscissa is the motion strength value and an ordinate is a blending coefficient value, where, three preset values of base_motion, blend_slope and top_motion are preset. A corresponding mapping relationship may be determined through the three preset values. The three preset values are set to ensure that a slope of a line segment is negative, that is, the stronger the motion, the smaller the blending coefficient, otherwise a motion blur and even streaking may be caused.

Operation of blending: According to the blending coefficient α obtained by the operation of blending coefficient mapping, the motion vector obtained by the operation of motion estimation, and the image subjected to the spatial denoising obtained by the operation of spatial denoise, a weighted averaging may be performed to obtain a final output image. The calculation formula is as follows:

$$f\_out(n,ij)=f\_in\_spa(n,ij)*(1-\alpha)+f\_out(n-1,i+mvij+mvj)\alpha$$

where (i, j) is the two-dimensional coordinates of the pixel point to be denoised, (mvi, mvj) is the motion vector of the pixel point to be denoised, n is the nth video frame in the video frame sequence, f_in_spa(n,ij) is the pixel point to be denoised of the nth video frame subjected to the spatial denoising, and f_out(n−1, i+mvi, j+mvj) is the pixel point of the n−1th video frame subjected to denoising.

Compared with related technologies, the video denoising method provided in the embodiments of the present disclosure includes: dividing each video frame in the input video frame sequence into the sub-image blocks, and calculating the block variance of each of the sub-image blocks; calculating the average variance for all sub-image blocks in the current video frame according to the calculated block variances, determining the noise level of the current video frame according to the calculated average variance, and selecting the denoise strength and the noise characteristic curve that match the noise level; and denoising the current video frame according to the denoise strength and the noise characteristic curve. The method can effectively improve the accuracy of the noise level estimation. The matching denoise strength and noise characteristic curve are selected according to the estimated noise level, which can effectively eliminate the noise and prevent the loss of image details due to the excessive denoise strength, so as to achieve better overall denoising performance.

Some embodiments of the present disclosure also provide a computer-readable storage medium, configured to store one or more programs, where the one or more programs may be executed by one or more processors to perform the following operations:

dividing each video frame in an input video frame sequence into sub-image blocks, and calculating a block variance of each of the sub-image blocks; calculating an average variance of all the sub-image blocks in a current video frame according to the calculated block variances, determining a noise level of the current video frame according to the calculated average variance, and selecting a denoise strength and a noise characteristic curve that match the noise level; and denoising the current video frame according to the denoise strength and the noise characteristic curve.

In an exemplary embodiment, the calculating the block variance of each of the sub-image blocks includes:

calculating a spatial variance of each of the sub-image blocks; calculating a temporal variance between each of the sub-image block in the current video frame and a sub-image block in a corresponding position in a previous video frame of the current video frame; and selecting a smaller value of the spatial variance and the temporal variance as the block variance of each of the sub-image block.

In an exemplary embodiment, the calculating the average variance of all the sub-image blocks in the current video frame according to the calculated block variances includes:

sorting the block variances of all the sub-image blocks in the current video frame in an ascending order; and accumulating the sorted first n block variances of sub-image blocks, and taking a ratio of an accumulated sum of the block variances to the n as the average variance of all the sub-image blocks in the current video frame, where the n is a natural number greater than 1.

In an exemplary embodiment, the determining the noise level of the current video frame according to the calculated average variance includes:

recording the noise level of the current video frame as 0 when the calculated average variance is less than a preset variance value; and taking the calculated average variance as the noise level of the current video frame when the calculated average variance is greater than or equal to the preset variance value.

In an exemplary embodiment, before the selecting the denoise strength and the noise characteristic curve that match the noise level, the operation further includes:

calculating an average value of the noise levels of the current video frame and m video frames prior to the current video frame, where the m is a natural number greater than 1; and taking the calculated average value of the noise levels as a smoothed noise level of the current video frame.

In an exemplary embodiment, the denoise strength includes a spatial denoise strength and a temporal denoise strength.

Denoising the current video frame according to the denoise strength and the noise characteristic curve includes:

performing a spatial denoising on the current video frame according to the spatial denoise strength and the noise characteristic curve; estimating a motion strength and a motion vector of each of the sub-image blocks of the current video frame according to the current video frame and a previous video frame of the current video frame; and obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame subjected to the spatial denoising and pixel points in the previous video frame pointed to by the motion vectors corresponding to the pixel points in the current video frame to obtain denoised pixel points.

In an exemplary embodiment, an algorithm of the spatial denoising is a block matching and 3D filtering (BM3D) denoising algorithm, and a proportionately scaling operation is performed on a Wiener coefficient in a Wiener filtering operation of the BM3D denoising algorithm according to a brightness value of the pixel points in the current video frame and the noise characteristic curve.

Some embodiments of the present disclosure also provide a video denoising device, including a processor and a memory, where: the processor is configured to execute a program stored in the memory to perform the following operations:

dividing each video frame in an input video frame sequence into sub-image blocks, and calculating a block variance of each of the sub-image blocks; calculating an average variance of all the sub-image blocks in a current video frame according to the calculated block variances, determining a noise level of the current video frame according to the calculated average variance, and selecting a denoise strength and a noise characteristic curve that match the noise level; and denoising the current video frame according to the denoise strength and the noise characteristic curve.

In an exemplary embodiment, the calculating the block variance of each of the sub-image blocks includes:

calculating a spatial variance of each of the sub-image blocks; calculating a temporal variance between each of the sub-image block in the current video frame and a sub-image block in a corresponding position in a previous video frame of the current video frame; and selecting a smaller value of the spatial variance and the temporal variance as the block variance of each of the sub-image block.

In an exemplary embodiment, the calculating the average variance of all the sub-image blocks in the current video frame according to the calculated block variances includes:

sorting the block variances of all the sub-image blocks in the current video frame in an ascending order; and accumulating the sorted first n block variances of sub-image blocks, and taking a ratio of an accumulated sum of the block variances to the n as the average variance for all the sub-image blocks in the current video frame, where the n is a natural number greater than 1.

In an exemplary embodiment, the determining the noise level of the current video frame according to the calculated average variance includes:

recording the noise level of the current video frame as 0 when the calculated average variance is less than a preset variance value; and taking the calculated average variance as the noise level of the current video frame when the calculated average variance is greater than or equal to the preset variance value.

In an exemplary embodiment, before the selecting the denoise strength and the noise characteristic curve that match the noise level, the operation further includes:

calculating an average value of the noise levels of the current video frame and m video frames prior to the current video frame, where the m is a natural number greater than 1; and taking the calculated average value of the noise levels as a smoothed noise level of the current video frame.

In an exemplary embodiment, the denoise strength includes a spatial denoise strength and a temporal denoise strength.

Denoising the current video frame according to the denoise strength and the noise characteristic curve includes:

performing a spatial denoising on the current video frame according to the spatial denoise strength and the noise characteristic curve; estimating a motion strength and a motion vector of each of the sub-image blocks of the current video frame according to the current video frame and a previous video frame of the current video frame; and obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame subjected to the spatial denoising and pixel points in the previous video frame pointed to by the motion vectors corresponding to the pixel points in the current video frame to obtain denoised pixel points.

In an exemplary embodiment, an algorithm of the spatial denoising is a block matching and 3D filtering (BM3D) denoising algorithm, and a proportionately scaling operation is performed on a Wiener coefficient in a Wiener filtering operation of the BM3D denoising algorithm according to a brightness value of the pixel points in the current video frame and the noise characteristic curve.

Figure 7:
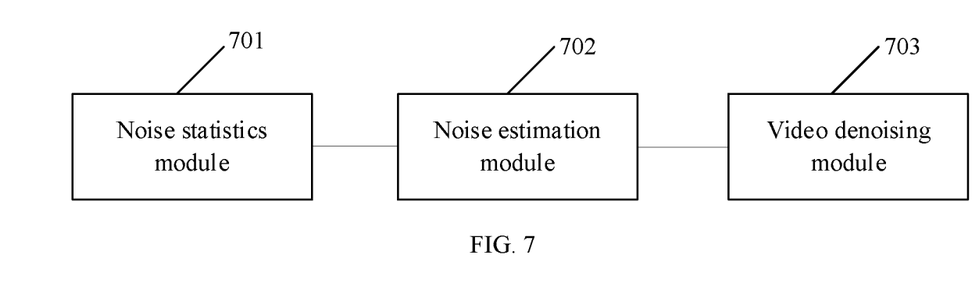
FIG. 7 is a schematic diagram of an exemplary structure of a video denoising device provided in an embodiment of the present disclosure.

As shown in FIG. 7, some embodiments of the present disclosure also provide a video denoising device, including a noise statistics module 701, a noise estimation module 702, and a video denoising module 703.

The noise statistics module 701 is configured to divide each video frame in an input video frame sequence into sub-image blocks, calculate a block variance of each of the sub-image blocks, and output the calculated block variances of the sub-image blocks to the noise estimation module 702.

The noise estimation module 702 is configured to calculate an average variance of all the sub-image blocks in the current video frame according to the calculated block variances, determine a noise level of the current video frame according to the calculated average variance, and select a denoise strength and a noise characteristic curve that match the noise level.

The video denoising module 703 is configured to denoise the current video frame according to the denoise strength and the noise characteristic curve.

In an exemplary embodiment, calculating the block variance of each of the sub-image blocks includes:

calculating a spatial variance of each of the sub-image blocks; calculating a temporal variance between each of the sub-image block in the current video frame and a sub-image block in a corresponding position in a previous video frame of the current video frame; and selecting a smaller value of the spatial variance and the temporal variance as the block variance of each of the sub-image block.

In an exemplary embodiment, outputting the calculated block variances of the sub-image blocks to the noise estimation module 702 includes:

sorting the block variances of all the sub-image blocks in the current video frame in an ascending order; accumulating the sorted first n block variances of sub-image blocks, and taking a ratio of an accumulated sum of the block variances to the n as the average variance of all the sub-image blocks in the current video frame, where the n is a natural number greater than 1.

In this embodiment, a current video frame f_in(n) with noise and a previous video frame f_in(n−1) of the current video frame f_in(n) are input to the noise statistics module 701, and the noise statistics module 701 divides the f_in(n) and the f_in(n−1) into sub-image blocks with a same size according to a first preset value. A spatial variance δs of each of the sub-image blocks in the f_in(n) is calculated. A temporal variance δt of each of the sub-image blocks in the f_in(n) is obtained by subtracting a pixel value of a sub-image block in a corresponding position in the f_in(n−1) from a pixel value of each of the sub-image blocks in the f_in(n). The smaller value of the spatial variance δs and the temporal variance δt of each of the sub-image blocks in the f_in(n) is a final variance of a sub-image block. After the variance value of each of the sub-image blocks in the f_in(n) being obtained, the multiple sub-image blocks are sorted according to the variance value in an ascending order. According to a second preset value, the variances of the sub-image blocks with a total number of the second preset value are accumulated, and then an accumulated sum of the variances and the second preset value are output.

In an exemplary embodiment, determining the noise level of the current video frame according to the calculated average variance includes:

recording the noise level of the current video frame as 0 when the calculated average variance is less than a preset variance value; and taking the calculated average variance as the noise level of the current video frame when the calculated average variance is greater than or equal to the preset variance value.

In an exemplary embodiment, before selecting the denoise strength and the noise characteristic curve that match the noise level, the noise estimation module 702 is further configured to:

calculate an average value of the noise levels of the current video frame and m video frames prior to the current video frame, where the m is a natural number greater than 1; and take the calculated average value of the noise levels as a smoothed noise level of the current video frame.

In an exemplary embodiment, the denoise strength includes a spatial denoise strength and a temporal denoise strength.

As shown in FIG. 2, the noise estimation module 702 receives the sum of the variances and a number of the sub-image blocks output by the noise statistics module 701, and calculates the average variance of each of the sub-image blocks. If the average variance of the sub-image blocks is less than a third preset value, 0 is written into a first input first output (FIFO), otherwise the average variance of the sub-image blocks is written into the FIFO. A depth of the FIFO may be 16, that is, noise level data of latest 16 frames can be stored. The smoothed noise level of the current video frame may be obtained by summing and averaging all the data in the FIFO. And then according to the noise level, the spatial denoise strength, the temporal denoise strength and the corresponding noise characteristic curve that match the noise level are selected.

In an exemplary embodiment, the video denoising module 703 is configured to:

perform a spatial denoising on the current video frame according to the spatial denoise strength and the noise characteristic curve, estimate a motion strength and a motion vector of each of the sub-image blocks of the current video frame according to the current video frame and a previous video frame of the current video frame, and obtain a weight of each pixel point in the current video frame according to the estimated motion strength, and obtain positions of pixel points participating in a temporal denoising in the previous video frame according to the estimated motion vectors, and perform a weighted average denoising on the pixel points in the current video frame after the spatial denoising and pixel points in the previous video frame pointed to by the motion vectors corresponding to the pixel points in the current video frame to obtain denoised pixel points.

In an exemplary embodiment, an algorithm of the spatial denoising is a block matching and 3D filtering (BM3D) denoising algorithm, and a proportionately scaling operation is performed on a Wiener coefficient in a Wiener filtering operation of the BM3D denoising algorithm according to a brightness value of the pixel point s in the current video frame and the noise characteristic curve.

In this embodiment, as shown in FIG. 3, input of the video denoising module 703 includes: the current video frame to be denoised f_in(n), a denoised previous video frame f_out (n−1), and a spatial denoise strength coefficient, a temporal denoise strength coefficient, the noise characteristic curve, and the noise level output by the noise estimation module 702. The video denoising module 703 includes five sub-modules: a spatial denoising sub-module, a motion estimation sub-module, a motion detection sub-module, a blending coefficient mapping sub-module and a blending sub-module. Herein, the spatial denoising sub-module performs the spatial denoising on the f_in(n) according to the spatial denoise strength and the noise characteristic curve transmitted from the noise estimation module 702 to obtain an image subjected to spatial denoising f_in_spa(n). The motion estimation sub-module calculates the motion vector value of each of the sub-image blocks in the f_in(n) according to the input two frames of image. The motion detection sub-module performs a motion detection on all the sub-image blocks in the current video frame f_in(n) in a block-based manner, and obtains the motion strength of each of the sub-image blocks. The image subjected to spatial denoising f_in_spa(n), the motion vector output by the motion estimation sub-module, and the motion strength information output by the motion detection sub-module are output to a temporal denoiser (including the blending coefficient mapping sub-module and the blending sub-module) to perform a temporal denoising. The temporal denoiser first obtains the weight of each pixel point participating in the temporal denoising according to the motion strength information, and obtains the positions of the pixel points participating in the temporal denoising in the previous video frame according to the motion vector information, and then performs a weighted average denoising on the pixel points in the current video frame and the pixel points pointed to by the motion vectors in the previous video frame to obtain the final denoised pixel points. The working principle of the multiple modules is as follows.

Spatial denoising sub-module: As shown in FIG. 4, the spatial denoising sub-module of the present disclosure uses the BM3D denoising algorithm and provides improvement to this algorithm to make the algorithm more adaptable to characteristics of the noise introduced by a video capture device. During the operation of the Wiener filtering, the present disclosure performs a scaling operation in a certain proportion on the Wiener coefficient according to the brightness value of the pixel points and the noise characteristic curve. The spatial denoising sub-module in the present disclosure does not necessarily apply the BM3D algorithms, a guided filtering, a bilateral filtering and other filtering algorithms are all practicable, but a processing effect is slightly worse.

Motion estimation sub-module: The current video frame to be denoised f_in(n) is divided according to a preset value, and an image of the f_in(n) is divided into the sub-image blocks. The sub-image blocks may be overlapped, and then for each of the sub-image blocks, a calculation operation of a minimum squared error (MSE) is performed on all the sub-image blocks within a certain search range centered on a corresponding position in the denoised previous video frame f_out(n−1). As shown in FIG. 5, the sub-image block corresponding to the calculated smallest MSE value is set as a best matching block corresponding to the current sub-image block in the current video frame, and the motion vector is obtained by subtracting a coordinate value of the current sub-image block from a coordinate of the best matching block in the previous frame of image.

Motion detection sub-module: According to the calculation of the motion estimation sub-module, each sub-image block in the current video frame to be denoised corresponds to one best matching block in the previous video frame, and a calculation operation of sum of absolute difference (SAD) is performed on each of the sub-image blocks and the corresponding best matching block.

$$SAD = \sum_{i=0}^{i=M} \sum_{j=0}^{j=N} |p_t(i,j) - p_{t-1}(i,j)|,$$

where the SAD value of each of the sub-image blocks is regarded as a motion strength value of each of the sub-image blocks, where (i, j) is a two-dimensional coordinate of a pixel point to be denoised, and $0 \leq i \leq M$, $0 \leq j \leq N$.

Blending coefficient mapping sub-module: As shown in FIG. 6, the blending coefficient $\alpha$ may be obtained by mapping according to the motion strength value calculated by the motion detection sub-module. In FIG. 6, an abscissa is the motion strength value and an ordinate is a blending coefficient value, where, three preset values of base_motion, blend_slope and top_motion are preset. A corresponding mapping relationship may be determined through the three preset values. The three preset values are set to ensure that a slope of a line segment is negative, that is, the stronger the motion, the smaller the blending coefficient, otherwise a motion blur and even streaking may be caused.

Blending sub-module: According to the blending coefficient $\alpha$ obtained by the blending coefficient mapping sub-module, the motion vector obtained by the motion estimation sub-module, and the image subjected to spatial denoising obtained by the spatial denoising sub-module, a weighted averaging may be performed to obtain a final output image. The calculation formula is as follows:

$$f\_out(n,ij)=f\_in\_spa(n,ij)*(1-\alpha)+f\_out(n-1,i+mvij+mvj)\alpha$$

where (i, j) is the two-dimensional coordinates of the pixel point to be denoised, (mvi, mvj) is the motion vector of the pixel point to be denoised, n is the nth video frame in the video frame sequence, f_in_spa(n,ij) is the pixel point to be denoised of the nth video frame subjected to spatial denoising, and f_out(n−1, i+mvi, j+mvj) is the pixel point of the n−1th video frame subjected to denoising.

The video denoising method and device and the computer-readable storage medium provided in the embodiments of the present disclosure solve the problem that the image noise estimation is inaccurate and that the denoising performance and image quality cannot be balanced in related technologies by combining the noise estimation method for images with the denoising method for video images. The video denoising solution proposed in the embodiments of the present disclosure includes three modules: the noise statistics module 701, the noise estimation module 702, and the video denoising module 703. The noise statistics module 701 performs a block division according to the input video frame sequence, and performs statistics to obtain the information related to the noise level of the current video frame. The noise estimation module 702 selects the denoising related parameters which is real-time adjusted (including the spatial denoising strength, the temporal denoising strength, the noise characteristic curve and the noise level) according to the noise level information (mainly block variance information) obtained by the noise statistics module 701 and subjected to a certain preprocessing, and sends these parameters to the video denoising module 703. The video denoising module 703 performs the video denoising according to the denoising related parameters sent by the noise estimation module 702 in real time.

The video denoising scheme described in the present disclosure has the following advantages.

(1) The noise level is estimated according to the statistical characteristics of noise. There are two ways to estimate the noise level. One is based on the estimation for the adjacent two frames of the video, and the other is the noise estimation for the current video frame. The two algorithms are mutually verified, and can achieve higher accuracy rate.

(2) The noise level information calculated by the present disclosure is averaged information over (m+1) frames, and the noise level obtained is smoother, and there is no flickering phenomenon of one image frame being clear, but the next image frame being blurred, or one image frame having noise residual, and the next image frame having no noise residual caused by large jumps in the noise level.

(3) The algorithm applied in the present disclosure combines the spatial BM3D denoising algorithm, temporal motion compensation, and motion strength detection, this algorithm has a better effect and a not too high complexity, and achieves a good balance between the effect and complexity.

(4) According to a principle that the noise variance is proportional to the brightness, the present disclosure introduces the noise characteristic curve and dynamically adjusts the denoising strength according to the noise brightness, thereby achieving a better denoising effect.

What is claimed is:

1. A video denoising method, comprising:
dividing each video frame in an input video frame sequence into sub-image blocks, and calculating a block variance of each of the sub-image blocks;
calculating an average variance of sub-image blocks in a current video frame according to calculated block variances of the sub-image blocks in the current video frame, determining a noise level of the current video frame according to the average variance, and selecting a denoise strength and a noise characteristic curve that match the noise level; and
denoising the current video frame according to the denoise strength and the noise characteristic curve,
wherein calculating the block variance of each of the sub-image blocks comprises:
calculating a spatial variance of each of the sub-image blocks;
calculating a temporal variance between each of the sub-image block in the current video frame and a sub-image block in a corresponding position in a previous video frame of the current video frame; and
selecting a smaller value of the spatial variance and the temporal variance as the block variance of each of the sub-image block.

2. The method according to claim 1, wherein calculating the average variance of the sub-image blocks in the current video frame according to the calculated block variances of the sub-image blocks in the current video frame comprises:
sorting the block variances of the sub-image blocks in the current video frame in an ascending order; and
accumulating sorted first n block variances of sub-image blocks, and taking a ratio of an accumulated sum of the block variances to the n as the average variance of the sub-image blocks in the current video frame, wherein the n is a natural number greater than 1.

3. The method according to claim 1, wherein determining the noise level of the current video frame according to the average variance comprises:
in response to the average variance being less than a preset variance value, determining the noise level of the current video frame as 0; and
in response to the average variance being greater than or equal to the preset variance value, taking the average variance as the noise level of the current video frame.

4. The method according to claim 1, wherein after determining the noise level of the current video frame according to the average variance, and before selecting the denoise strength and the noise characteristic curve that match the noise level, the method further comprises:
calculating an average value of the noise levels of the current video frame and m video frames prior to the current video frame, wherein m is a natural number greater than 1; and
taking the calculated average value of the noise levels as a smoothed noise level of the current video frame.

5. The method according to claim 1, wherein the denoise strength comprises a spatial denoise strength and a temporal denoise strength;
denoising the current video frame according to the denoise strength and the noise characteristic curve comprises:
performing a spatial denoising on the current video frame according to the spatial denoise strength and the noise characteristic curve;
estimating a motion strength and a motion vector of each of the sub-image blocks of the current video frame according to the current video frame and a previous video frame of the current video frame; and
obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame subjected to the spatial denoising and pixel points in the previous video frame pointed to by the motion vectors corresponding to the pixel points in the current video frame to obtain denoised pixel points.

6. The method according to claim 5, wherein an algorithm of the spatial denoising is a block matching and 3D filtering, BM3D, denoising algorithm, and a proportionately scaling operation is performed on a Wiener coefficient in a Wiener filtering operation of the BM3D denoising algorithm according to a brightness value of the pixel points in the current video frame and the noise characteristic curve.

7. A non-transitory computer-readable storage medium, configured to store at least one program, the at least one program being executable by at least one processor, to perform a video denoising method, comprising:
dividing each video frame in an input video frame sequence into sub-image blocks, and calculating a block variance of each of the sub-image blocks;
calculating an average variance of sub-image blocks in a current video frame according to calculated block variances of the sub-image blocks in the current video frame, determining a noise level of the current video frame according to the average variance, and selecting a denoise strength and a noise characteristic curve that match the noise level; and
denoising the current video frame according to the denoise strength and the noise characteristic curve,
wherein calculating the block variance of each of the sub-image blocks comprises:
calculating a spatial variance of each of the sub-image blocks;
calculating a temporal variance between each of the sub-image block in the current video frame and a sub-image block in a corresponding position in a previous video frame of the current video frame; and
selecting a smaller value of the spatial variance and the temporal variance as the block variance of each of the sub-image block.

8. The non-transitory computer-readable storage medium according to claim 7, wherein calculating the average variance of the sub-image blocks in the current video frame according to the calculated block variances of the sub-image blocks in the current video frame comprises:
sorting the block variances of the sub-image blocks in the current video frame in an ascending order; and
accumulating sorted first n block variances of sub-image blocks, and taking a ratio of an accumulated sum of the block variances to the n as the average variance of the sub-image blocks in the current video frame, wherein the n is a natural number greater than 1.

9. The non-transitory computer-readable storage medium according to claim 7, wherein determining the noise level of the current video frame according to the average variance comprises:
in response to the average variance being less than a preset variance value, determining the noise level of the current video frame as 0; and
in response to the average variance being greater than or equal to the preset variance value, taking the average variance as the noise level of the current video frame.

10. The non-transitory computer-readable storage medium according to claim 7, wherein after determining the noise level of the current video frame according to the average variance, and before selecting the denoise strength and the noise characteristic curve that match the noise level, the method further comprises:
calculating an average value of the noise levels of the current video frame and m video frames prior to the current video frame, wherein m is a natural number greater than 1; and
taking the calculated average value of the noise levels as a smoothed noise level of the current video frame.

11. The non-transitory computer-readable storage medium according to claim 7, wherein the denoise strength comprises a spatial denoise strength and a temporal denoise strength;

denoising the current video frame according to the denoise strength and the noise characteristic curve comprises:
performing a spatial denoising on the current video frame according to the spatial denoise strength and the noise characteristic curve;
estimating a motion strength and a motion vector of each of the sub-image blocks of the current video frame according to the current video frame and a previous video frame of the current video frame; and
obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame subjected to the spatial denoising and pixel points in the previous video frame pointed to by the motion vectors corresponding to the pixel points in the current video frame to obtain denoised pixel points.

12. The non-transitory computer-readable storage medium according to claim 11, wherein an algorithm of the spatial denoising is a block matching and 3D filtering, BM3D, denoising algorithm, and a proportionately scaling operation is performed on a Wiener coefficient in a Wiener filtering operation of the BM3D denoising algorithm according to a brightness value of the pixel points in the current video frame and the noise characteristic curve.

13. A video denoising device, comprising a processor and a memory, wherein the processor and the memory are connected to each other by an electrical coupling, and the processor is configured to execute a program stored in the memory, so as to perform a video denoising method, comprising:
dividing each video frame in an input video frame sequence into sub-image blocks, and calculating a block variance of each of the sub-image blocks;
calculating an average variance of sub-image blocks in a current video frame according to calculated block variances of the sub-image blocks in the current video frame, determining a noise level of the current video frame according to the average variance, and selecting a denoise strength and a noise characteristic curve that match the noise level; and
denoising the current video frame according to the denoise strength and the noise characteristic curve,
wherein calculating the block variance of each of the sub-image blocks comprises:
calculating a spatial variance of each of the sub-image blocks;
calculating a temporal variance between each of the sub-image block in the current video frame and a sub-image block in a corresponding position in a previous video frame of the current video frame; and
selecting a smaller value of the spatial variance and the temporal variance as the block variance of each of the sub-image block.

14. The video denoising device according to claim 13, wherein calculating the average variance of the sub-image blocks in the current video frame according to the calculated block variances of the sub-image blocks in the current video frame comprises:
sorting the block variances of the sub-image blocks in the current video frame in an ascending order; and
accumulating sorted first n block variances of sub-image blocks, and taking a ratio of an accumulated sum of the block variances to the n as the average variance of the sub-image blocks in the current video frame, wherein the n is a natural number greater than 1.

15. The video denoising device according to claim 13, wherein determining the noise level of the current video frame according to the average variance comprises:
in response to the average variance being less than a preset variance value, determining the noise level of the current video frame as 0; and
in response to the average variance being greater than or equal to the preset variance value, taking the average variance as the noise level of the current video frame.

16. The video denoising device according to claim 13, wherein after determining the noise level of the current video frame according to the average variance, and before selecting the denoise strength and the noise characteristic curve that match the noise level, the method further comprises:
calculating an average value of the noise levels of the current video frame and m video frames prior to the current video frame, wherein m is a natural number greater than 1; and
taking the calculated average value of the noise levels as a smoothed noise level of the current video frame.

17. The video denoising device according to claim 13, wherein the denoise strength comprises a spatial denoise strength and a temporal denoise strength;
denoising the current video frame according to the denoise strength and the noise characteristic curve comprises:
performing a spatial denoising on the current video frame according to the spatial denoise strength and the noise characteristic curve;
estimating a motion strength and a motion vector of each of the sub-image blocks of the current video frame according to the current video frame and a previous video frame of the current video frame; and
obtaining a weight of each pixel point in the current video frame according to the estimated motion strength, and obtaining positions of pixel points participating in a temporal denoising in the previous video frame according to the estimated motion vectors, and performing a weighted average denoising on the pixel points in the current video frame subjected to the spatial denoising and pixel points in the previous video frame pointed to by the motion vectors corresponding to the pixel points in the current video frame to obtain denoised pixel points.

* * * * *

UNITED STATES PATENT AND TRADEMARK OFFICE
CERTIFICATE OF CORRECTION

PATENT NO.         : 12,125,173 B2
APPLICATION NO.    : 17/624237
DATED              : October 22, 2024
INVENTOR(S)        : Jisong Ai et al.

Page 1 of 1

It is certified that error appears in the above-identified patent and that said Letters Patent is hereby corrected as shown below:

In the Specification

Column 6, Line 31, the formula reading:
*f_out(n,ij)=f_in_spa(n,ij)\*(1−α)+f_out(n−1,i+mvi,j+mvj)α*
Should read:
-- f_out(n,i,j)=f_in_spa(n,i,j)*(1-α)+f_out(n-1,i+mvi,j+mvj)α --

Column 6, Line 36, the parameter reading:
- f_in_spa(n,ij) -
Should read:
-- f_in_spa(n,i,j) --

Column 12, Line 56, the formula reading:
*f_out(n,ij)=f_in_spa(n,ij)\*(1−α)+f_out(n−1,i+mvi,j+mvj)α*
Should read:
-- f_out(n,i,j)=f_in_spa(n,i,j)*(1-α)+f_out(n-1,i+mvi,j+mvj)α --

Column 12, Line 61, the parameter reading:
- f_in_spa(n,ij) -
Should read:
-- f_in_spa(n,i,j) --

Signed and Sealed this
Fourth Day of March, 2025

Coke Morgan Stewart
*Acting Director of the United States Patent and Trademark Office*